United States Patent
Danchenko et al.

(10) Patent No.: US 8,124,009 B2
(45) Date of Patent: Feb. 28, 2012

(54) METHOD OF AERATION DISINFECTING AND DRYING GRAIN IN BULK AND PRETREATING SEEDS AND A TRANSVERSE BLOW SILO GRAIN DRYER THEREFOR

(75) Inventors: Vitaliy G. Danchenko, Dnipropetrovsk (UA); Ronald T. Noyes, Stillwater, OK (US); Larysa P. Potapovych, Dnipropetrovsk (UA)

(73) Assignee: The United States of America as represented by the United States Department of Energy, Washington, DC (US)

( * ) Notice: Subject to any disclaimer, the term of this patent is extended or adjusted under 35 U.S.C. 154(b) by 459 days.

(21) Appl. No.: 12/344,150

(22) Filed: Dec. 24, 2008

(65) Prior Publication Data

US 2009/0191091 A1 Jul. 30, 2009

(51) Int. Cl.
| | |
|---|---|
| A61L 9/00 | (2006.01) |
| A01M 13/00 | (2006.01) |
| E04H 7/22 | (2006.01) |
| F26B 9/04 | (2006.01) |
| H05B 1/00 | (2006.01) |
| F24H 3/06 | (2006.01) |
| F16K 49/00 | (2006.01) |
| B05B 1/24 | (2006.01) |

(52) U.S. Cl. .................. 422/1; 422/28; 422/30; 422/32; 422/123; 422/124; 422/292; 422/186.07; 422/186.09; 422/305; 43/125; 43/129; 454/174; 454/181; 454/182; 454/234; 454/235; 454/236; 454/251; 34/443; 34/497; 34/511; 34/145; 219/200; 392/356; 392/360; 392/494; 392/379; 261/DIG. 42; 137/338; 239/135; 426/312; 426/320

(58) Field of Classification Search ................ 422/1, 28, 422/30, 32, 123–124, 292, 186.07, 186.09, 422/305; 43/125, 129; 454/174, 181–182, 454/234–236, 251; 34/443, 497, 511, 145; 219/200; 392/356, 360, 494, 379; 261/DIG. 42; 137/338; 239/135; 426/312, 320
See application file for complete search history.

(56) References Cited

U.S. PATENT DOCUMENTS

| | | | |
|---|---|---|---|
| 2004/0202570 A1* | 10/2004 | Nadkarni | 422/28 |
| 2007/0134380 A1* | 6/2007 | Vetter et al. | 426/320 |

* cited by examiner

*Primary Examiner* — Jill Warden
*Assistant Examiner* — Monzer Chorbaji
(74) *Attorney, Agent, or Firm* — Michelle P. Nguyen; John T. Lucas

(57) ABSTRACT

Aeration drying and disinfecting grain crops in bulk and pretreating seeds includes passing through a bulk of grain crops and seeds disinfecting and drying agents including an ozone and air mixture and surrounding air, subdividing the disinfecting and drying agents into a plurality of streams spaced from one another in a vertical direction, and passing the streams at different heights through levels located at corresponding heights of the bulk of grain crops and seeds transversely in a substantially horizontal direction.

7 Claims, 6 Drawing Sheets

A

B – B

D-D

E – E

F-F

METHOD OF AERATION DISINFECTING AND DRYING GRAIN IN BULK AND PRETREATING SEEDS AND A TRANSVERSE BLOW SILO GRAIN DRYER THEREFOR

CROSS-REFERENCE TO A RELATED APPLICATION

The invention described and claimed hereinbelow is also described in Eurasian Patent Convention Application UA 2007 14550 filed on Dec. 24, 2007. This Eurasian Patent Convention Application, whose subject matter is incorporated herein by reference, provides the basis for a claim of priority of invention under 35 U.S.C. 119(a)-(d).

BACKGROUND OF THE INVENTION

The present invention relates to agriculture, and, more particularly, to grain crop treatment and can be used on farms and in the grain crops-elevator industry.

Methods and devices are known for grain crop storage, based on the use of ozone-enriched air, including heated air for drying, disinfecting, detoxification, storing grain crops, and pretreating seeds before sowing. Also, corresponding technical solutions for realization of the above mentioned methods is known.

It is well known that the greatest quantitative losses of grain crops and seeds in the moist state are caused by their spoilage during their temporary keeping on grain-floors after harvesting and preparing for storage. In the Ukraine and other CIS countries the losses reach 25% of gross grain harvest because of insufficient quantity of drying facilities, the high cost of equipment and power, and the low quality of processes for drying grain crops and seeds, as well as the absence of effective methods for disinfecting and detoxification of damaged grain and seeds.

It is possible to decrease the spoilage of moist grain and seeds if the aeration system allows constant and uniform drying of grains and seeds, even if the process is slow. This is possible for a comparatively thin (2 m-3 m) layer of grains and seeds. The reliability of this slow process for drying grain and seeds would be higher if the grain and seeds, simultaneously with drying, were subjected to treatment with a disinfectant prepared in the form of an ozone and air mixture.

A method for drying seeds of grain cultures is known, in which to intensify the process of drying and decrease its power consumption, the ozone and air mixture, with an ozone concentration of 2 $mg/m^3$-1.0 $mg/m^3$, is passed through the layer of seeds. This method is based on intensification of the water evaporation process inside the seeds under ozone action. While interacting with the seeds, ozone starts decomposing in accordance with the scheme $2O_3=3O_2+68$ kcal/mol. Generated oxygen assists in improving the oxidizing processes inside the seeds and, as a result, provides for rising temperature in the seeds and diffusion of moisture from the seeds. One product of the ozone and seeds interaction is hydrogen peroxide, which is used as a bacterial agent for detoxification of seeds.

It has been found by researchers that adding ozone accelerates the drying process by no more than by 5%, which is insufficient to use it as a drying agent. At the same time, the process of drying is considerably shortened with an increase in temperature and airflow rate blowing through the grain and seeds. Ozone is an effective disinfectant, which suppresses action of microorganisms that cause spoilage of grain and seeds.

Seed sterilization methods based on heating and moisturizing of the seeds by vapor and water are known. The subsequent process of drying seeds is performed by microwaves and ozone, while the seeds are moving on a conveyor.

Seed treatment based on lowering the pressure in the storehouses with subsequent supply of the agent into them is also known.

The use of ozone for intensification of the process of grain and seeds drying and for elimination pests and diseases is also well known.

Fungus inactivation by ozone, which is more efficiently performed at higher values of temperature and humidity, has been studied. The level of initial humidity has no influence on the germination of barley seeds, and the high doses of ozone lower the index.

The influence of treatment by ozone in grain and seeds quality and germination energy has also been studied. Some lowering of the indices after treatment of grain and seeds by ozone was noted.

The problem of efficiency of the ozone used as a fumigant in the case of grain storage has also been explored. The treatment of 8.3 t grain by ozone at a concentration of 107 $mg/m^3$ during three days caused death of 92%-100% of storehouse pests. The basic characteristics of the grain did not worsen.

Studies have shown that the period of grains and seeds storage lengthens in a sour environment due to the lowering of their biological activity.

The fumigation of grains and seeds by a thermal dryer equipped with a system for ozone sterilization of the grain in the seeds is known. The system is arranged before the discharge opening of the dryer.

The above mentioned solutions show that the use of ozone as a fumigant is more efficient, safe and not as expensive as the application of toxic chemicals. As a disinfectant, ozone removes a microbial cause of spoilage of grains seeds, and because of its high solubility in water, it is especially active in a moist environment. Ozone application is also effective for elimination of storehouse pests.

A method of detoxification (reanimation) of moist grain and seeds having first signs of spoilage (mold) is known. As a rule, special toxins accumulate in a mass of grain and seeds, which in the case of concentrations exceeding 5 mg per 1 kg of the grain and seeds lead to diseases, which affect not only animals and birds, but also people.

Nowadays, in order to provide detoxification of grain and seeds, a method of thermal treatment is mainly utilized. This method prevents subsequent development of microflora, however, it does not destroy harmful toxins that have already been generated.

Technology for storage of grains and seeds spoiled by storehouse pests has been studied. The loss of grain vital function reached 3%-5%. Pesticides used for grain and seed disinfection caused contamination of grain by the remaining chemical substance. The method of ozone disinfection in accordance with the results of the research, provided for effective and environmentally clean protection of the grain and seeds while maintaining their organoleptic and physical and chemical properties. The method efficiently destroyed mold toxins and provided sterilization of insects.

A method for pretreatment of seeds before sawing is known, in which an ozone and air mixture is used as a growth-stimulating substance. The method is carried out in clamps on a field ground with the use of a compressor, ozonizer, and plastic hoses equipped with injectors being are arranged inside bulks. This technology is simple, however, it does not provide an even distribution or maintenance of ozone concentration inside the bulk, or adjustment of air temperature in the interseeds space and seed humidity, which stimulates ozone activity. These disadvantages of the disclosed method prevent the achievement of expected stabile results.

The advantages of ozone application for treatment of grain and seeds are determined by a complex action of its drying and bactericidal properties, and also by its ability to stimulate the enzymatic system of seeds promoting productivity.

However, despite acceptable ecological characteristics and high properties as a disinfectant, ozone has not been practically used on an industrial scale since there have been no technical solutions related to ozone delivery to each level of grain and seeds bulks without changing the initial characteristics of ozone. It is explained by a short period (about 40 minutes) of ozone life and its high specific gravity, in comparison with air.

It is believed that the mechanism of spoilage of moist grain and seeds resides in the reduction of oxygen consumption with anaerobic breathing, which begins the irreversible processes of fermentation. Ozone is capable of reanimating grain and seeds by penetrating inside grains due to its oxidizing properties and supplying oxygen, which is necessary for renewal of the vital functions of grain and seeds.

A method for treatment of grain seeds, which is the closest to the method in accordance with the present invention, includes air drying of the grain and seeds with transverse blowing through the grain and seeds bulk placed in a bunker by an ozone and air mixture, including a mixture that is heated. The ozone and air mixture is delivered through a central perforated pipe. It has been shown that the use of ozone and air mixture for drying grain seeds is more effective than with surrounding air. The twelve hour period of the process with the use of the ozone and air mixture, with an ozone concentration of 3 mg/m$^3$-5 mg/m$^3$, reduces the time of drying by 20%. It has been found that heating up the ozone and air mixture results in considerable acceleration of the drying process when compared to the active aeration (ventilation) process with external (ambient) air. Active aeration with the use of ambient air heated to 3° C.-6° C. at a feeding flow rate of about 100 m$^3$/h-250 m$^3$/h per 1 ton reduces the time of drying by a 17-18%.

The transverse (horizontal) blowing through grain and seeds in bulk as well as the use of the ozone and air mixture for intensification of drying process has several disadvantages. It is not possible to provide stability of temperature and relative humidity of gas due to direct contact of grain and seeds with ambient air through an opening in the perforated case of the dryer. The treatment of grain and seeds is uneven because of different values of air flow rates per bulk height. Energy consumption is increased because of an insufficient degree of controlling the layer-by-layer drying process of the bulk. The maximum permissible level of ozone concentration around the dryer can be exceeded because of uncontrolled exhaust of ozone through perforations in the dryer case and because of the lowered functional possibilities of ozone under such conditions. Furthermore, the system reliability is decreased due to the use of a piston that moves inside the air-distributing device.

Structural solutions for bunkers with a standard aeration system (in the direction from below to top) and a perforated bunker with transverse (horizontal) blowing through the bulk are known.

In the marketplace there are well known intrasilo thermal dryers. An advantage of these dryers is their relatively high speed of drying. However, they also have the following disadvantages. They are characterized by high power consumption to provide high temperature drying and subsequent cooling of grain and seeds. They require a high cost of power media to be used, such as natural gas or diesel fuel. Furthermore, grain and seeds and the environment are contaminated by combustion products of the power media. Cracking and spoilage of grain and seeds are possible because of temperature drops resulting from high heating and sharp cooling. The quality of grain and seeds drying is insufficient. The dryer has high manufacturing and maintenance cost, and there are also fire-hazards during drying of oil-bearing cultures.

A bunker having a perforated shell case is known. The bunker has a cone-shaped roof upper part and a lower part with a discharging bottom whereon there is mounted a perforated and distributing device equipped with an inner piston regulator for discharging air. Such a bunker with a perforated case is penetrable for rain. Grain and seeds when inside such a bunker are sensitive to changes in temperature and environmental humidity. The bunker is used only in a closed compartment for storage of a grain and seeds lot of about 40 t.

A prototype silo device for storing grain and seeds includes a case composed of panels, a cone-shaped roof, and a bottom fastened in the silo axle cylinder container, which has perforations and is connected with a ventilator by a pipeline. The pipeline is provided with a branch pipe for coupling the pipeline with a source for feeding a gaseous fumigant. The silo provides for aeration of grain and seeds according to a traditional scheme from bottom to top by means of air supplied in its lower part. This technical solution also provides for a possibility of disinfection of grain and seeds.

This traditional system of aeration has some disadvantages including high energy consumption because of the use of a high power ventilator for blowing medium through the grain and seeds column from the bottom to the top, so that in each subsequent zone of grain and seed bulk along the silo height the air or fumigant enters with characteristics which have been substantially changed as compared to the initial characteristics. Another disadvantage includes accidental "cavitations" being formed in the grain and seeds bulk as "channels" through which air further moves, resulting in some areas of bulk (standard areas) that have not been treated by the air stream outgrowing into hearths of self-heating and spoilage of the grain and seeds. Still another disadvantage is the low speed of removing moisture which moves with air through the whole column of grain and seeds and does not correspond to the criteria of drying requirements.

Fumigation of grain and seeds in this case is also not effective. In the first turn, the fumigation concerns such an environmentally clean and effective fumigant, ozone, which in the moist environment quickly, during 30-40 minutes, decomposes and does not provide even treatment of all levels of bulk.

SUMMARY OF THE INVENTION

Accordingly, it is an object of the present invention to provide a method of aeration disinfecting and drying grain in bulk and penetrating seeds and a transverse blow silo grain dryer therefore, which avoids the disadvantages of the prior art.

More particularly, it is an object of the present invention to provide a method of aeration disinfecting and drying grain in bulk and penetrating seeds and a transverse blow silo grain drive which provides for high quality of drying of grain and seeds for their subsequent safe storage in warehouses, to lower the drying process cost and to provide for effective and environmentally clean grain and seed disinfection, to replace expensive and non-ecological power media, such as natural gas and oil, with inexpensive and environmentally clean electric power used to operate a ventilator, to provide for the possibility of high-quality drying for corresponding conditions after intentionally incomplete drying in a thermal dryer, to provide for detoxification of moist grain and seeds that have been damaged by pests for their possible subsequent safe use, to provide conditions for high-quality storage of large batches of seeds at field locations, to provide for a reliable increase of crop productivity due to pretreatment of seeds of different cultures by ozone before sowing, to design a universal unit (dryer with a transverse blowing through) that makes it possible to effectively realize the methods of drying, disinfection, detoxification, storing of seeds and growth-stimulating pretreatment of seeds before sowing, and to provide higher assembly and operating quality along with universal and reliable dryer equipment operation at low costs.

In keeping with these objects and with others which will become apparent hereinafter, one feature of the present invention resides, briefly stated, in a method of aeration drying and disinfecting grain crops in bulk and pretreating seeds, comprising the steps of passing through a bulk of grain crops and seeds disinfecting and drying agents including an ozone and air mixture and surrounding air; subdividing the disinfecting and drying agents into a plurality of streams spaced from one another in a vertical direction; and passing the streams at different heights through levels located at corresponding heights of the bulk of grain crops and seeds transversely in a substantially horizontal direction.

Another feature of the present invention resides, briefly stated, in a device for aeration drying and disinfecting grain crops in bulk and pretreating seeds, comprising a means for passing through a bulk of grain crops and seeds disinfecting and drying agents including an ozone and air mixture and surrounding air; a means for subdividing the disinfecting and drying agents into a plurality of streams spaced from one another in a vertical direction, a means for passing the streams at different heights through levels located at corresponding heights of the bulk of grain crops and seeds transversely in a substantially horizontal direction.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
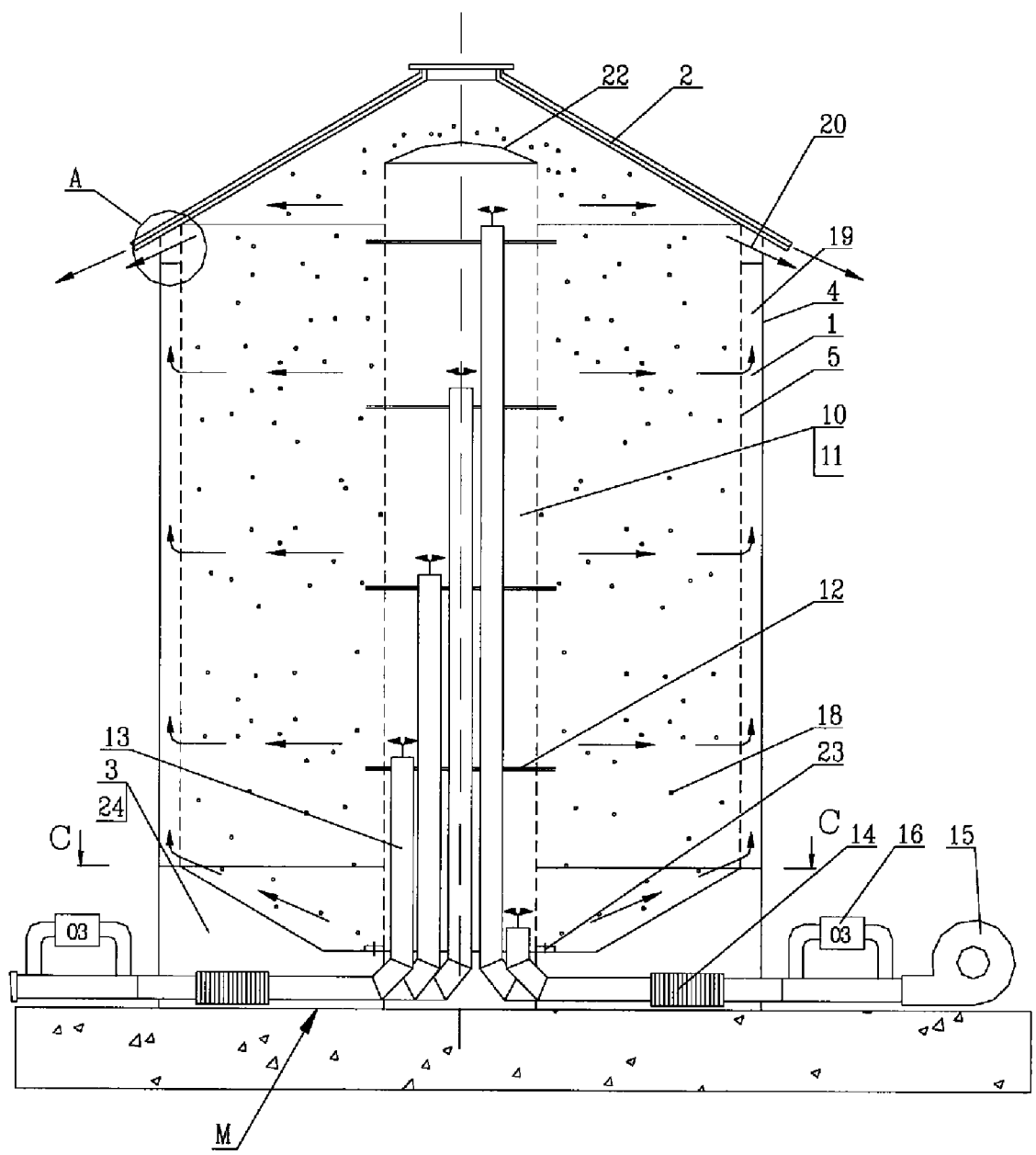
FIG. 1 is a view showing a dryer in accordance with the present invention.
Figure 2:
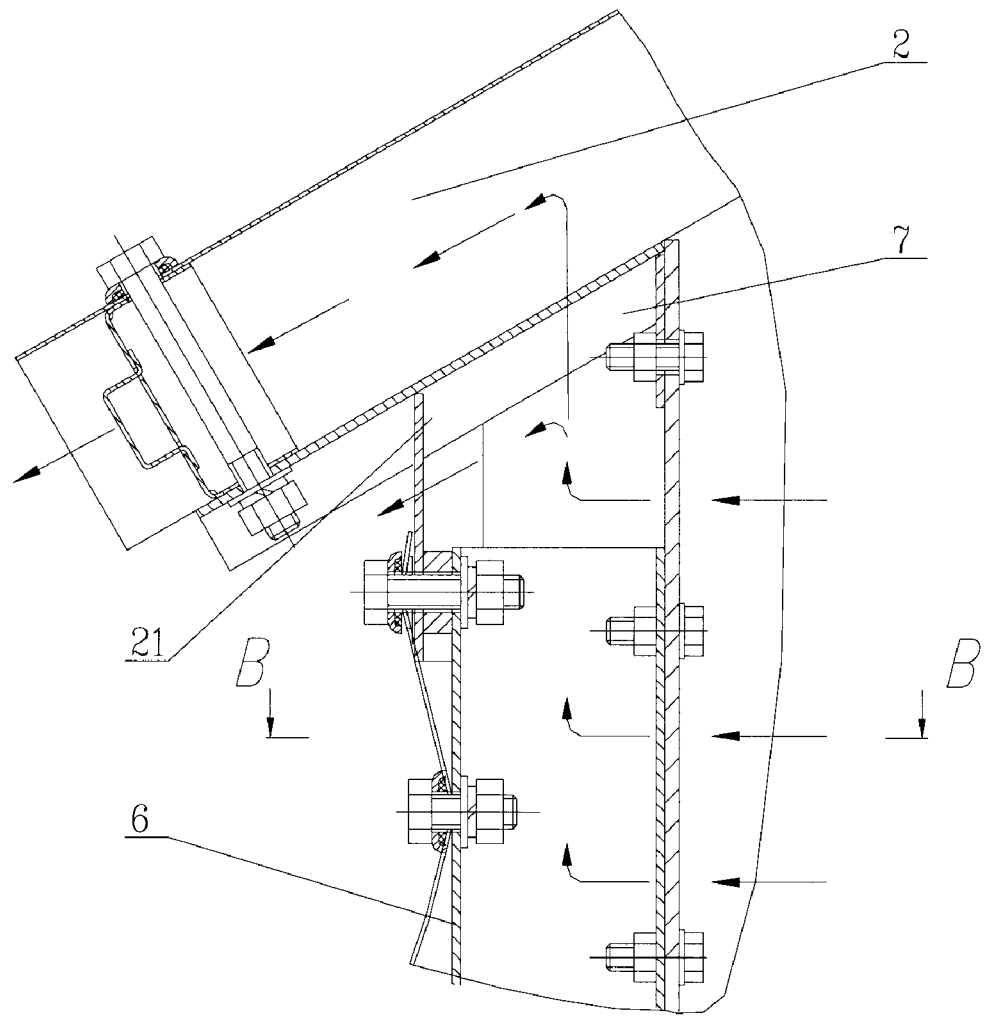
FIG. 2 is view A from FIG. 1 showing an element for jointing assembly of a case with a roof of the inventive dryer.
Figure 3:
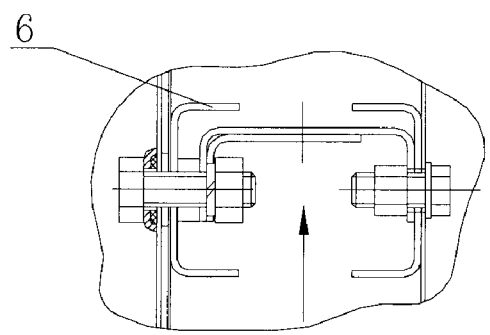
FIG. 3 is a view showing a cross-section along the line B-B from FIG. 2 of the joining assembly of external and internal shells of the case.
Figure 4:
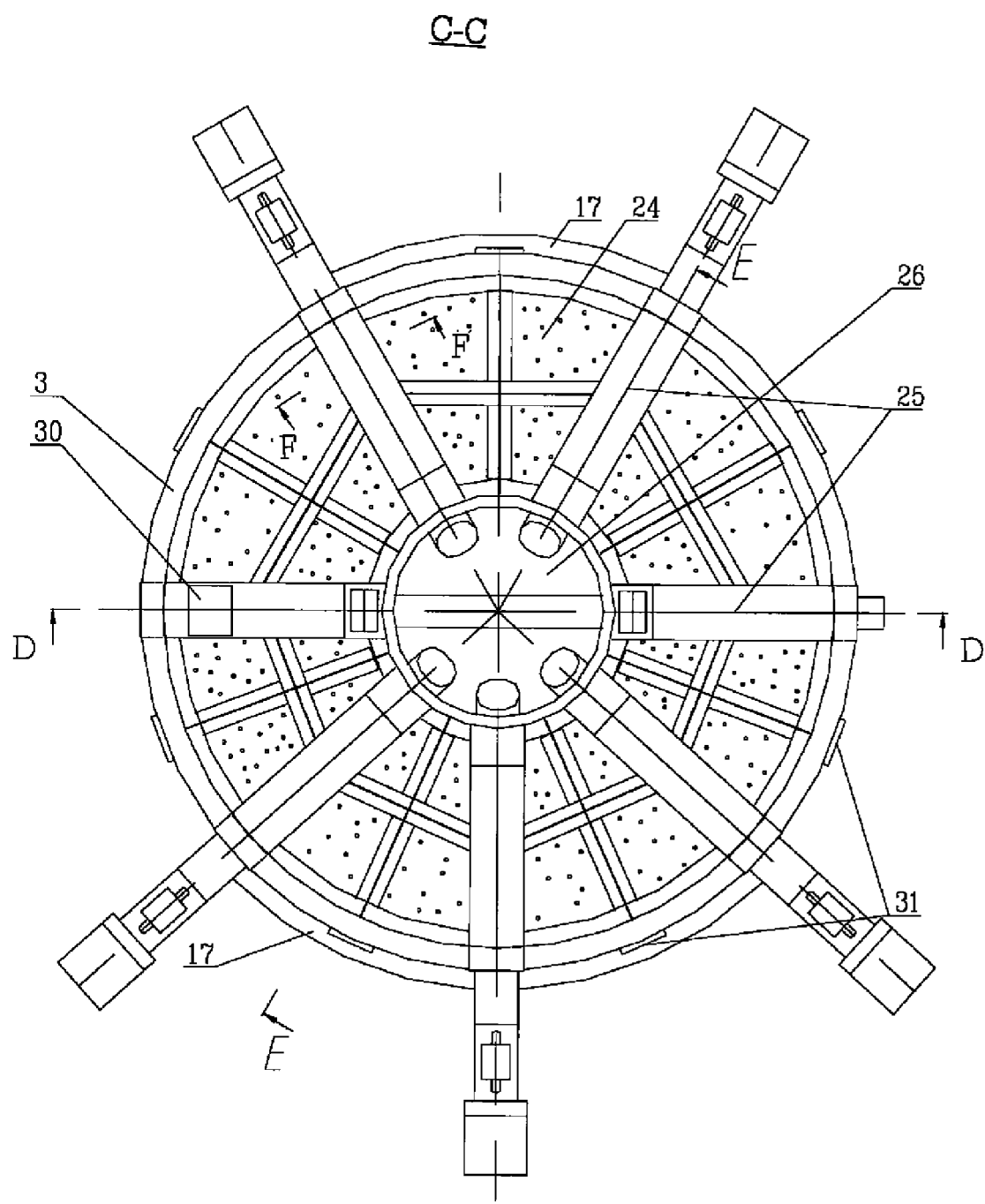
FIG. 4 is a view showing a transverse cross-section along the line C-C from FIG. 1 with a bottom view.
Figure 5:
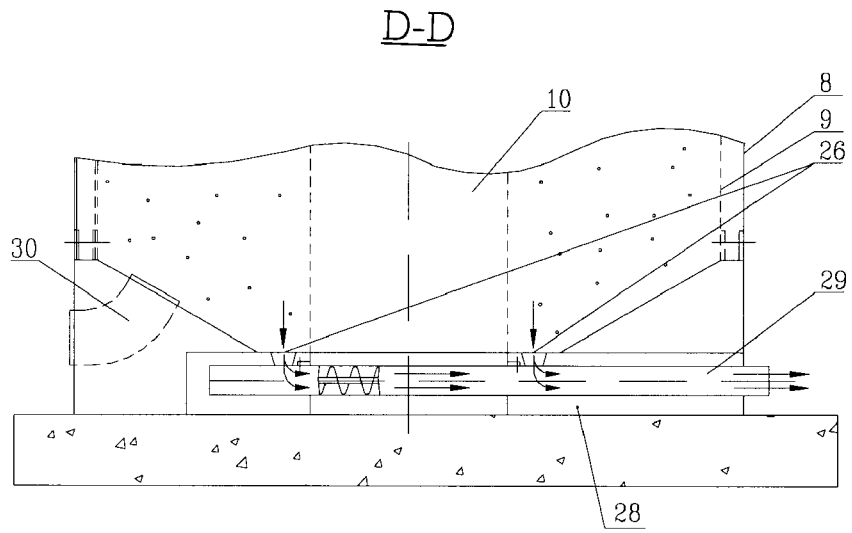
FIG. 5 is a view showing a transverse cross-section taken along the line D-D from FIG. 4 of a bottom with an installed screw.
Figure 6:
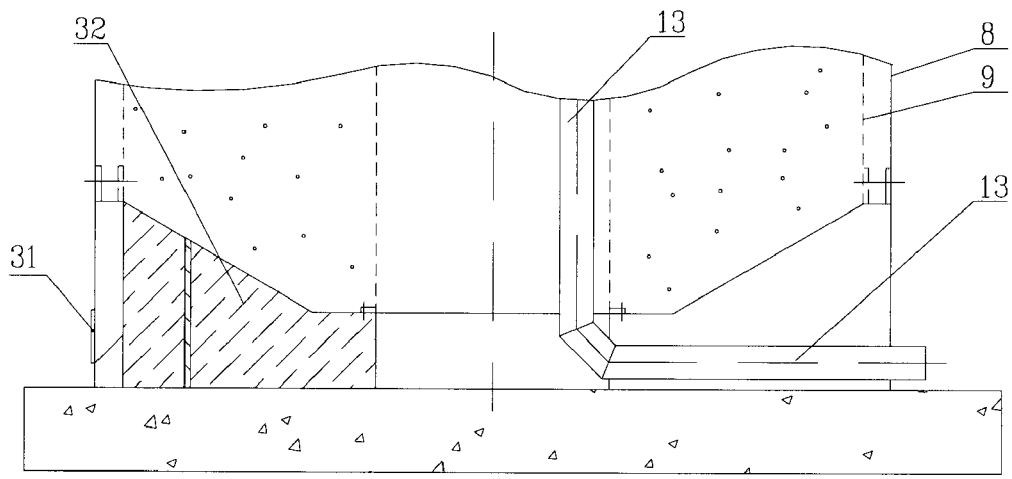
FIG. 6 is a view showing a transverse cross-section taken along the line E-E from FIG. 4 of a bottom with installed pipelines.
Figure 7:
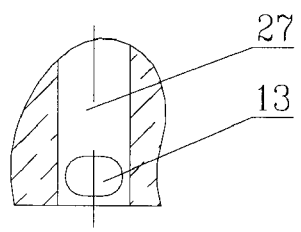
FIG. 7 is a view showing a transverse cross-section taken along the line F-F from FIG. 4 of a channel with installed pipelines.

In accordance with the present invention a method is proposed for aeration disinfecting and drying grain crops in bulk and penetrating seeds, in accordance with which grain crops (seeds) in bulk are arranged in a silo container through which a stream of ambient air is blown, including heated ambient air, and an ozone and air mixture is also blown as a drying and disinfecting agent. The grain crops (seeds) in bulk are disinfected and dried by blowing the above agents layer by layer through the grain crops (seeds) in bulk in the transverse direction. The agents are added to each bulk layer with their identical initial characteristics, and each waste agent is removed outside without additional contact with the grain crops (seeds).

The method in accordance with the present invention is carried out as follows.

1. Disinfection of Grain Crops (Seeds)
  1.1 After charging moist grain crop (seeds) into the silo container, all layers of the grain crops (seeds) bulk are simultaneously blown through by ambient air at a flow rate of about 150 $m^3$/h to about 450 $m^3$/h per one ton of the grain crops (seeds) and at a pressure of about 2000 to about 6000 Pa during the period of time of about 0.5 to about 2 hours to stabilize the arrangement of the grain crops (seeds) in the bulk and to perform intergrain channels.
  1.2 Ambient air, including heated air, is supplied to the bulk layers until the temperature of 20° C.-38° C. is obtained in the intergrain space of the bulk.
  1.3 An ozone and air mixture is added to the bulk layers with the flow rate of about 20 $m^3$/h to about 100 $m^3$/h per one ton of the grain crops (seeds) during a period time of about 2 to about 8 hours. The concentration of ozone in the intergrain space is about 0.05 $g/m^3$ to about 0.2 $g/m^3$. The treatment process is completed when the ozone dose reaches a range of about 8 g/t to about 26 g/t. Further, to complete the process of saturation of grain crops (seeds) with ozone, the grain crops (seeds) exposure takes place over a period of 1-3 hours.

2. Drying of Grain Crops (Seeds).

All layers of the grain crops (seeds) bulk (five for 60 t per dryer) are simultaneously dried to achieve standard humidity, using ambient air with a flow rate of about 150 $m^3$/h to about 450 $m^3$/h per 1 ton of grain crop (seeds) and at the air stream pressure of about 2000 Pa to about 6000 Pa and at a temperature of 20-60° C. into the intergrain space of the bulk. The portion of air heated up to 5° C. is preferably supplied alternating with an ambient air supply with periodicity of 2 to 4 hours and of 0.5 to 1 hour accordingly.

3. Detoxification of Moist Grain Crops (Seeds) Having Initial Signs of Spoilage.

Operations 1.1, 1.2, and 1.3 are repeated, and the concentration of ozone in the intergrain space in accordance with 1.3 is provided within the range of about 0.1 $g/m^3$ to about 0.5 $g/m^3$, duration of the bulk treatment by ozone is provided in the range of about 3 hours to about 10 hours, and the ozone dose is provided within the range of about 10 g/t to about 36 g/t.

4. Inhibition of Store-House Pests in Drying Grain Crops (Seeds).

First operations 1.1, 1.3 are repeated. Ozone concentration in ozone and air mixture is about 0.04 g/m$^3$ to about 0.15 g/m$^3$, ozone dose is about 6 g/t to about 20 g/t. Then after the exposure period of 1-3 hours the bulk is blown through by ambient air (without heating) during a period of about 2 to about 5 hours.

If mobile larvae are detected in the bulk, the above mentioned operations are repeated in 6-10 days.

5. Seeds Preparation for Storing in Silo Container.

All layers of the bulk are simultaneously dried by ambient air at a temperature in the intergrain space from 20-38° C., and then the seeds are blown through by ambient air during 24 hours and then stored under conditions of regular blowing operations.

6. Seed Preparation for Sowing.
   6.1. Operation 1.1 is repeated, and the upper surface of the bulk is preferably covered with elastic screen or cardboard.
   6.2. Seeds are moistened by 2-10% more as compared to the initial humidity, for example by using air blown through water.
   6.3. Air inside the bulk is heated up to a temperature range of 20-38° C.
   6.4. Grain crops (seeds) bulk is processed layer-by-layer by an ozone and air mixture during a period from about 0.2 hours to about 2 hours with the flow rate of about 20 m$^3$/h to about 100 m$^3$/h per 1 ton of the grain crops (seeds) and pressure of about 2,000 Pa to about 10,000 Pa and at a concentration of ozone in the mixture of about 0.05 g/m$^3$ to about 0.5 g/m$^3$. The process is performed with an ozone dose, depending on the type of seeds, from about 3 g/t to about 36 g/t.
   6.5. Seed exposure is carried out during the period of time of about 2 hours to about 6 hours.
   6.6. If necessary, seeds are dried to a standard humidity value at temperature range from 20-38° C.
   6.7. Before sowing, seeds are subjected to exposure in the bulk for the period of time of 3-15 days.
      During the development of the new inventive method, a series of experiments were conducted and the following parameters were selected:
      component parts of a dryer design,
      expendable characteristics of the equipment,
      conditions for disinfection and detoxification of moist grain crops (seeds),
      condition for sanitary treatment of pests in dry grain crops (seeds),
      conditions for drying,
      conditions for seeds storage,
      seeds treatment conditions for stimulating productivity.

The influence of the following factors on the process for disinfection and drying of grain crops (seeds) have been studied:
   support for layers of bulk in air supplying tracks,
   volumes of air as well as ozone and air mixture,
   air temperature and humidity,
   ozone and air mixture properties,
   influence of ozone dose amount and seed treatment conditions on productivity.

Figure 8:
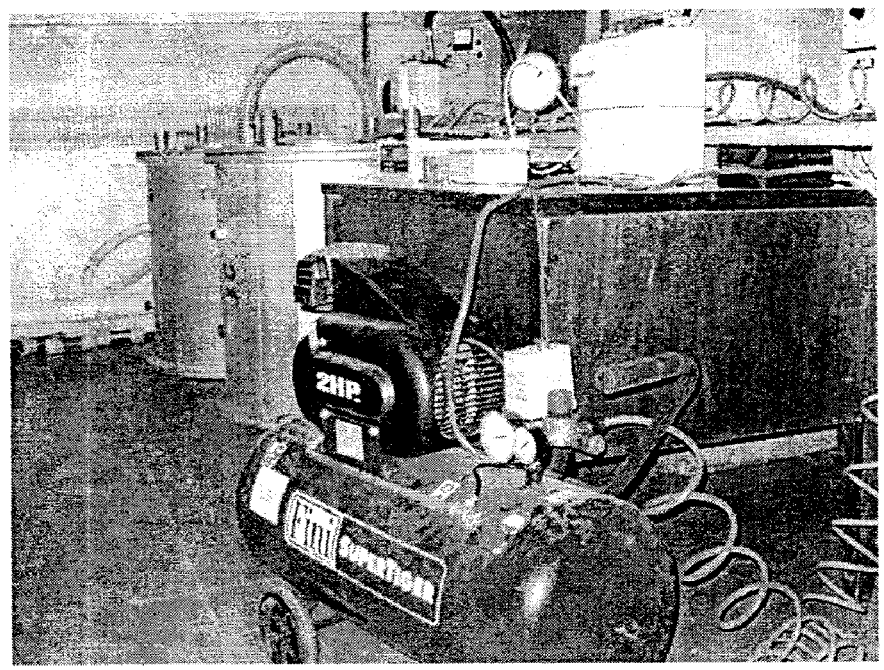
FIG. 8 is a view showing a pilot unit and equipment for research of technologies of dryer with disinfection, detoxification and pretreatment of grain and seeds before sowing.
Figure 9:
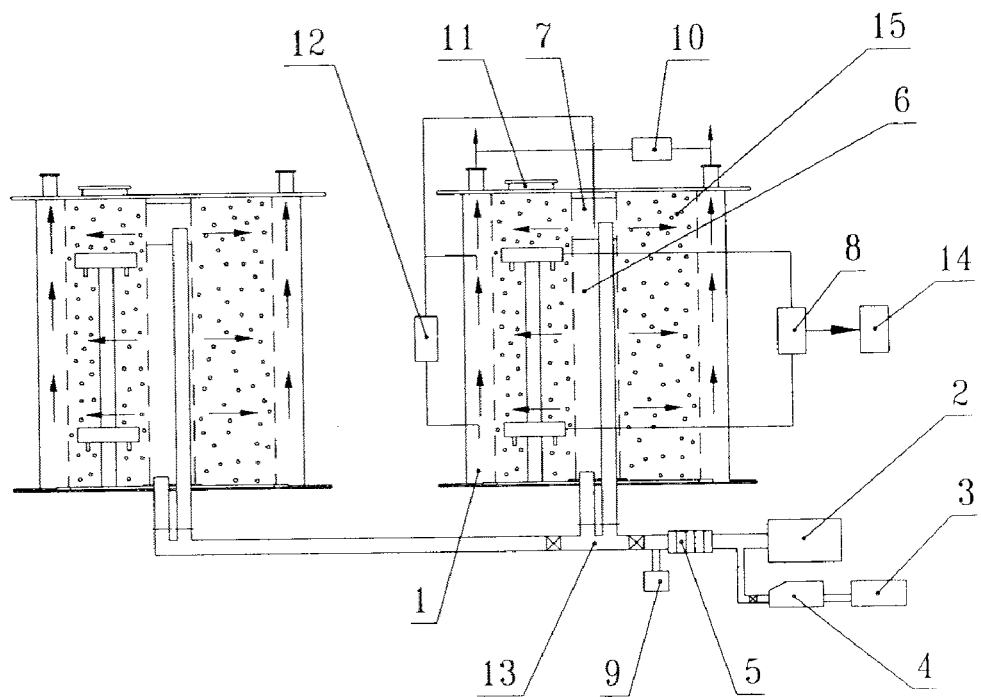
FIG. 9 is a view showing a pilot unit and equipment for testing.

Test for selecting conditions for treatment of grain and seeds were performed on a pilot unit shown in FIGS. 8 and 9. The unit includes an aluminum cylinder with 0.7 m diameter and 0.8 m height, covered with lids. A perforated shell with a diameter 0.64 m is installed inside the cylinder. An air distributing device with diameter 0.2 m is arranged on the lower lid in a center of a container. A pipeline connected with a ventilator, an ozonator, a compressor and a heater are arranged outwardly of the lower lid (opposite to the air input of the air distributing device). The compressor capacity is 10 m$^3$/h, ventilator capacity is 500 m$^3$/h and ozonizer capacity is 0.8 g/h. Air pressure at the compressor discharge is 10,000 Pa, and ventilator output is 1000 Pa.

Heat capacity of the heater is adjusted within the range of about 0.75 KW to about 8 KW. Sensors for automatic measurement of temperature and environmental humidity, and elements for controlling environmental pressure are arranged inside the unit. Gas analyzer with a scale 0 . . . 1 g/m$^3$ measure ozone concentration and volume flow rate of the mixture are determined with a gas flow meter. Humidity of grain and seeds specimen are determined by a gravometric method.

In FIG. 9, the pilot unit is identified as a whole with reference numeral 1. It has a ventilator 2, a compressor 3, an ozone generator 4, an air heater 5, sections of air distributing device 6, 7, a system block of temperature and agent humidity sensors 8, a gas O$_3$ analyzer 9, a flow meter 10, a grain and seeds sampler 11, an agent pressure gauge 12, a pipeline 13, a computer 14. Grain is identified with reference numeral 15.

Selection of Equipment for Grain and Seeds Treatment.

In order to determine optimal characteristics for the ventilator and ozonator, hydraulic supports of the bulk layers and air supplying tracks were explored. Measuring procedures were conducted on one of the bulk layers under loading imitating the weight of the previous layers. Initial data for computation of a ventilator power that has been used as the pilot unit were recalculated for the field dryer 60 t (grain and seeds height 4.4 m, diameter 4.58 m) and resulted in the following values.

Diameter of air supplying tracks 0.28 m,
diameter of air distributing device 1.3 m,
height of the air distributing device section 1.2 m,
size of the bulk in the radial direction 1.7 m,
number of simultaneously processed layers (wherein the fifth one is the upper conical layer), 4
weight of each layer in the horizontal plane 15 t,
resistance of upper layer of grain and seeds 1200 Pa,
resistance of lower layer of grain and seeds 1800 Pa,
differential resistance of two upper conjugated layers 10% differential resistance of two lower conjugated layers 25% and 35%,
resistance of air supplying tracks on external area (before the dryer input) 400 Pa, on an internal area 300 Pa,
flow rate of air stream that passes through the air supplying tracks $\geq$4000 m$^3$/h or $\geq$200 m$^3$/h per 1 t of grain and seeds,
total resistance at each two upper layers of the bulk (taking into account resistance of the air supply tracks), 1900 Pa and for each of the two lower layers 2200 Pa.

It was determined that ventilator power required for drying the upper layer is 2.9 KW and for drying the lower layer is 3.5 KW.

The characteristic for the ventilator is selected taking into consideration power supply and interchangeability, and also providing evenness at drying each of the bulk layers. The ventilator corresponds to this requirement when a flow rate is 4000 m$^3$/h, pressure 2500 Pa, and power 40 KW. The heater (air heater) power is selected as of about 8 KW to about 20 KW.

Based on the specified characteristics of the equipment, drying of 60 t batch of the moist wheat to obtain the standard humidity value is carried out during the period of time 7-17 hours depending on the initial humidity of grain and seeds and the temperature of the air supplied.

Vertical blowing through the bulk requires more power consumption as compared with the traverse blowing. Taking into account the porosity of the grain and seeds, the power consumption for vertical blowing is 2.5-3 times higher.

Characteristics for the ozone generator were selected with the use of the pilot unit loaded by a batch of grain with weight of 100 kg, with imitation of previous bulk layers by means of calibrated weights. Ozone concentration during the experiment was 0.8 g/m$^3$. The batch of grain had 20% humidity. Air temperature in the container was 22° C. During ozonizing, air flow rate was about 30 m$^3$/h to about 70 m$^3$/h per 1 ton. As a result of the experiment, the following was determined:

value of a bulk layer resistance to passing air stream non linearly depends on depth of a layer location. Difference of resistances between the upper and lower layers achieves 70%, pressure of a portion of air that is supplied to the ozonator must be sufficient (not less than 2000 Pa) to press the mass of grain through. Intergrain channels created by air streams generated by the ventilator improve the conditions for passing ozone and saturating grain by the same.

Development of Technology.

1. Disinfection of Moist Grain.

During the experiments grain was tested which was preliminarily treated by ozone, for resistance to spoilage. For this purpose, grain with humidity 28% was treated with ozone and air mixture at a flow rate of 60 m$^3$/h and pressure 6000 Pa. The treatment time was 4 hours at ozone concentration in the mixture of 0.1 g/m$^3$, ozone dose 15 g/t, room temperature 25° C. Traces of spoilage (sour smell) started exposing only in 10 days, which is considerably the later compared to grain that has not been ozone treated. Any hearths of mold or microtoxins were not exposed as well. After repeating the treatment by ozone with concentration 0.05 g/m$^3$ during 0.5 hour, the sour smell was removed. The organoleptric characteristics were not changed.

It was therefore confirmed that grain treated by ozone in the moist state has greater resistance to spoilage than grain that did not pass the disinfection procedure.

2. Detoxification of Grain Having Initial Traces of Spoilage.

The experiment was intended for studying ozone bactericidal influence on mold fungus. Grains with 28% humidity were kept at temperature at 25° C. during 8 days until considerable amount of mold hearths appeared. State of microflora before and after treatment of mold-damaged grain was controlled by microbiological tests. The organoleptric characteristics became worse at the mold-damaged grain, there were exposed microtoxins and acidity level was promoted. To detoxify mold-damaged grain, ozone air mixture was used with ozone concentration 0.21 g/m$^3$ and the exposure time 2 and 4 hours with ozone dose 14 g/t.

After ozone treatment of the batch of grain, no microtoxins were found, and acidity characterizing grain spoilage was lowered from 7.8 units to normal 5 units. The organoleptric characteristics were maintained. The portion of grain was fed to chicken, and no diseases were found.

It has been determined that the grain having initial traces of spoilage, due to treatment by ozone, could be reanimated for a subsequent use.

3. Treatment of Dry Grain that Had been Damaged by Store-House Pests.

A portion of wheat infected by insects in extreme quantity was subjected to treatment. The flow rate of ozone and air mixture blowing through grain was 50 m$^3$/h per one ton, with pressure of 8,000 Pa. Ozone concentration in the ozone and air mixture was 0.1 g/m$^3$ and the treatment time was two hours. It was noted that after first 0.01 hour, the mobility of insects increased, which took place for 0.2-0.3 hours. Then the mobility of the insects had notably become weak, and in 2 hours had been completely halted.

After interruption of ozone supply, the grain was ventilated during 0.5 hours to move remaining ozone in new layer. The insects were screened through a set of sieves and then living pests were calculated. Only a single specimen of flour tick and grain grinder exposed weak mobility. After repeated treatment of the same standard wheat with ozone air mixture, in 7 days 100% death of all insects were observed.

The obtained results confirmed that the action of ozone causes irreversible changes in chromosomes of insect cells. Additional treatment is conditional to the fact that time of vital functions of insects after their coupling proceeds for the period of 6-9 days.

4. Drying of Grains and Seeds.

During the experiments the following methods of moisture removal from the grain and seeds bulk were researched:

by ambient air,
by heated air,
by ozone and air mixture,
by alternating heated air and ambient air.

Test 1:

In the pilot unit drying of 120 kg of wheat was conducted at ambient air temperature of 15° C. The airflow rate at the ventilator output was 150 m$^3$/h per 1 t and pressure 1000 Pa. Grain and seeds bulk was dried from 24% to 14% in 34 hours.

The experiment was repeated under the same conditions, but with the use of air heated by electric heater of 1.2 kW with air temperature in intergrain space of about 26° C., grain and seeds were dried up for up to 16 hours, which is more than twice quicker.

Test 2:

A portion of grain which was subjected to drying with mass of 110 kg at initial ambient temperature 25° C. and at relative humidity 60% was tested. During the first experiment the airflow rate for blowing through was 150 m$^3$/h per 1 t, during the second experiment the airflow for blowing through was 200 m$^3$/h per 1 t.

With airflow rate of 150 m$^3$/h without heating, grain and seeds were dried from 20% humidity to 14% humidity in 22 hours, and with heating to about 35° C.-in 10 hours.

With airflow rate of 200 m$^3$/h without heating the time of drying was 20 hours, and with heating up by electric air heater power 0.75 kW-9 hours. Thus, due to increased airflow rate, the time of drying became shorter by 10%.

Test 3:

The use of ozone and air mixture for drying grain and seeds with a flow rate 80 m$^3$/h per 1 t and ozone concentration 0.06 g/m$^3$ without heating up of the mixture allowed to increase the intensity of drying approximately by 3.5%.

Test 4:

Conditions of grain and seeds drying with alternating feeding of heated air and ambient air into the intergrain cavities were studied. 120 Kg of wheat was subjected to drying at 21.2% initial humidity. The airflow rate was 200 m$^3$/h per 1 ton. Initial room temperature was 18° C. Air in the intergrain space was heated by air heater with power 1 KW. Drying was carried in two identical cycles: Drying by heated air during 2.5 hours and cooling by ambient air during 0.75 hours. In the intergrain space, after cycle 1 there was air temperature 28° C. After 0.75 hour of cooling, temperature became 22° C. After heating, in cycle 2 air temperature was 33° C. and after cooling it became 23° C.

The results of the tests can be summarized as follows:
final grain and seeds humidity is up 13.9% (after 6 hours of cooling in the unit −12.3%),
total time of heating is 5 hours, total time of cooling is 1.5 hours, or 6.5 hours all together.
after cooling grain and seeds (cycle I), condensation of moisture appeared on container walls. In cycle II condensation of moisture air was not found,
cycle I of air heating allows to takeoff moisture when compared with initial moisture by 0.8%, and after 0.75 hours of cooling—by 0.95% when compared with initial value,
air heating in cycle II reduces grain and seeds humidity by 5.3% and after cooling—by 7.3% as compared with initial value.

Based on the test results the following conclusions were made:
Intensity of drying increases linearly with increasing flow rate and temperature of supplying air. Removal of 1% moisture at airflow rate from 150 m³/h to 200 m³/h per 1 ton without heating takes place approximately within 3-4 hours. If air temperature rises by 10° C. in the intergrain space, removal of 1% moisture takes place approximately within 1.5 hours,
Intensity of drying at increasing airflow rate from about 150 m³/h per 1 ton to about 200 m³/h per 1 ton is increased by 11%. Intensity of drying with application of ozone and air mixture is increased up to 5%. The use of ozone and air mixture, including the heating mixture, for drying grain and seeds, thus simultaneously provides disinfection of grain and seeds,
With drying without heating, humidity of grain and seeds was higher in the upper layer as compared to a lower layer. This problem was eliminated by supplying air under the dryer roof.
Time for removal of 1% of moisture with alternating air heating and air cooling in the unit is about 1 hour.
Removal of moisture from grain and seeds with alternating air heating and cooling is not linear: After cycle I it makes 1%, after cycle II it makes 7.3%. In doing so, after each cooling procedure in the heated bulk within 0.75 hours at temperature difference in the intergrain spaced from 6° C. to 10° C., humidity of grain and seeds decreased by 1-1.4%,
Method of drying with the use of alternating heating air procedure and cooling air procedure is more than 1.5 times, at the same conditions, effective as compared to the procedure when only air heating up is used. Also, power consumption is reduced and equipment service life is increased.

Pretreatment of Seeds Before Sowing.

Pretreatment before sowing for some batches (35 kg each) of dry seeds of soy, sunflower and corn was conducted in the pilot unit.

For each type of seeds, the required dose of ozone is provided, taking into account the power of ozone generator and the flow rate of the air portions supplied to the ozonator. Two processes stimulating growth of seeds were tested:
treatment of dry seeds by different ozone doses of 3 g/t-36 g/t at ambient temperature 15° C.;
treatment of moistened seeds by different doses of ozone of from about 3 g/t to about 36 g/t and increased temperature in the intercedes space.

Time of treatment of seeds with ozone was from about 0.2 to about 2 hours, flow rate was from about 20 m³/h to about 100 m³/h per 1 ton with pressure from about 2000 to about 10000 Pa.

In accordance with another approach, the seeds were initially moistened by 2-10% more than the initial humidity, and air in the intergrain space was heated up to a temperature from 20-38° C.

After treatment with ozone, seeds were kept inside during first 3-15 hours for about 6 hours a day to provide vegetative ripening. Then, the seeds were sown on a control field using standard sowing equipment.

Results of treatment of seeds with ozone were compared after harvesting with results of the control field where non-treated seeds had been sown.

After field testing of seeds that were subjected to pretreatment before sowing, the following results were obtained:
seeds of sunflowers which did not get a sufficient ozone dose had 50% lower harvest than seeds for the control sowing;
with sufficient ozone doses, the productivity was increased by about 20% when compared to the control fields;
sowing seeds which did not get a sufficient ozone dose had 10% lower productivity than the seeds in the control field, while with sufficient ozone doses the productivity was increased by about 40% when compared to the control fields;
productivity of soy seeds and sunflower seeds that were treated by ozone in a moist state and at identical doses of ozone was higher by 9-12% when compared to seeds that were treated at a dry state,
grain seeds which did not have a sufficient ozone dose resulted in 22% lower harvest than the seeds on the control field (at higher ozone doses when treatment of grain seeds was not conducted). At the same time amount of low protein in the grain with ozone increased by 6.5% when compared to the grain harvested on the control field, and total humidity of the seeds treated with ozone was less than of the control seeds by 9-12%.

Based on the results of field testing of seeds that were subjected to pretreatment before sowing, the following conclusions were made.

1. Depending on preparation conditions and received ozone dose, seeds productivity can be increased by about 40% and more, and decreased by about 50%. The reduction of productivity takes place both in case of ozone underdoses and overdoses.

2. Dependency of seed treatment time from ozone dose related to its mass and treatment conditions can be described by the following formula:

$$t = m*d*(60/q)*k_1*k_2,$$

where t is exposure time, min,
q is ozonizer power, g/h,
m is mass of process seeds, t,
d is ozone dose, g/t,
60 is normalizing coefficient,
$k_1$ is empirical coefficient taking into account seeds humidity.
For dry grain in the initial state $k_1=1$,
$k_2$ empirical-coefficient taking into account degree of air heating in the intergrain states. For ambient air with heating $k_2=1$.

3. Characteristic curve was developed which shows dependency of seed productivity from ozone dose. This characteristic curve is shown in FIG. 10.

Figure 10:
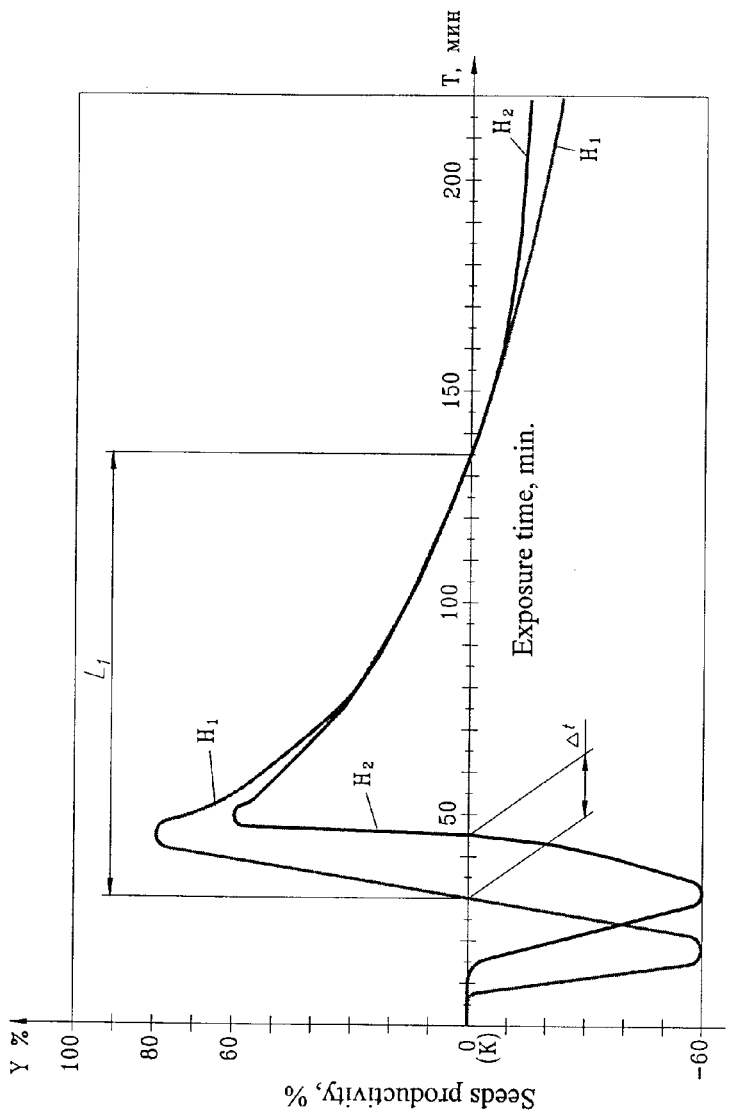
FIG. 10 is a view showing a productivity of ozone treated seeds.

In FIG. 10
T—is exposure time, min,
O—is control,
$H_1$—is a parameter characteristic of ozone treated moisture seeds,
$H_2$ is a parameter characteristic of ozone treated dried seeds.
$L_1$ is an area of increased productivity,
$\Delta t$ is a time interval of drying grain (seeds) saturation with ozone ($k_1 * k_2$).

This characteristic curve can change depending on treatment time for seeds of different cultures.

4. Due to greater permeability of seed shell in moist and heated state, greater doses of ozone are obtained for identical period of time when compared to dry seeds. In order to obtain identical ozone dose, the dry seeds time of treatment when compared to moist seeds time of treatment must be increased approximately by 40%; the value of $k_1 * k_2$ in the formula will be approximately 0.65%.

5. With the exception of ozone dose, seeds productivity depends on such factors as a degree of seeds vegetative ripening, soil state, weather conditions and other factors, whose influence does not allow to obtain maximum (theoretical) values of productivity (more than 60% when compared to standard conditions). Taking into account the fact that insignificant ozone overdose in case of seeds treatment is less perceptible for productivity than underdose, to provide a reliability of positive results, it is desirable to increase ozone doses by 10-15% when compared with optimal values.

6. Treating seeds with ozone, depending on the received dose, can result in increasing as well as in decreasing the productivity. Also, optimum ozone doses provide for a grain and seeds a resistance to pests and allow them to be better adapted to unfavorable weather factors.

7. Higher harvest on fields which were sown with ozone treated seeds is explained by the fact that compared to standard external sowing conditions, under which there is activated only a part (about 60%) of all enzymes in seeds, ozone because of so-called biological provocation activates all enzymes including the reserve. However, in case of insufficient or excessive ozone dosage, the enzymatic system instead of being activated, can be repressed.

8. The actual biologically active ozone in seeds is most intense under conditions which are friendly to development of seeds, or in other words at elevated values of humidity, temperature, and oxygen content. Activation of biochemical and biophysical properties of enzymes stimulates obtaining of additional potential energy leaving the enzymes into actively stable state providing for beginning of growth.

9. Mechanism of ozone activation of enzymatic system of seeds resides in forming, due to oxidizing properties inside seeds (dielectrics) of superficial charge and electric field, which starts by a chemical processes and seeds germination. Thus, this method of activation of seeds is more comfortable and efficient than direct void of seeds in the electric field, whose tension can exceed tension required for air.

10. At ozone doses that are less than the optimum values, the seeds productivity diminishes as a result of redistribution of initial potential of the enzymatic system for the greater (almost twice) amount of activated enzymes of total energy, which turns out not enough for their achievement of the state of stability.

11. At ozone doses that are higher than the optimum values, ozone surplus results in destruction of vegetable tissue and accumulation in cells of so called active forms of oxygen, which destroy functionally active matters, as a result, the productivity goes down.

12. Mechanism of ozone activating the enzymatic system of seeds consists in formed due to the oxidizing process in seeds (dielectrics), superficial charge and electric field, which starts biochemical processes of seed germination. Thus such method of activation of seed growth is more comfortable and effective, than direct moving of seed in the electric field, the tension of which can exceed tension required for air.

The proposed method is characterized by the following distinctive features:

the silo container is executed by a heat-insulated device, that eliminates a contact of the grain and seed material with the external walls of the container;

the grain and seed bulk in the silo contact is disinfected and dry layer by layer, using central sectional perforated pipe to supply an agent. The heights of layers are limited by condition of providing identical (equal) gas flow rate values at any transverse cut of the dryer;

to each of the bulk layers, there are supplied agents with parameters which do not differ from the parameters of charging sources;

after contacting with the grain and seeds, the used agents are removed through the "jacketed" cavity into the slot openings located in the upper part of grain and seeds to eliminate the subsequent contact of the agents with the grain and seeds material;

to perform disinfection of the moist grain and seeds material, first, there are created intergrain air ducts due to the intensive blowing the bulk through by the ambient air, then this air is warmed up, whereupon the bulk is treated by the ozone and air mixture;

to dry the grain and seeds material, there is alternatively used the air that had been warmed-up by no less than 5° C., as compared to the temperature of the ambient air, and the air without warming up, these are alternated with the time periodicity of 2 hours to 4 hours and of 0.5 hours to 1 hour accordingly;

to provide disinfecting, drying and pretreating the grain and seeds, there are uses the following conditions:

a) grain and seeds disinfecting and detoxification:
ozone air mixture flow rate is of 20 $m^3$/h to 100 $m^3$/h per 1 ton;
ozone air mixture is of 2000 Pa to 10000 Pa;
air temperature in the intergrain space is from 20° C. to 38° C.;
ozone air mixture ozone concentration is from 0.05 g/m3 to 0.5 g/m3;
ozone air mixture grain and seeds exposure time is from 2 hours to 10 hours;
ozone dose is from 3 g/t to 36 g/t;

b) aeration drying of grain and seed:
airflow rate is of 150 $m^3$/h to 450 $m^3$/h per 1 ton;
Air pressure is from 2000 Pa to 6000 Pa;
air temperature in the intergrain space is from 20° C. to 70° C.;
the periodicity of supplying warmed-up air and ambient air makes of 2 hours to 4 hours and of 0.5 hour to 1 hour accordingly;

c) Pretreating seeds before sowing:
ozone air mixture flow rate is of 20 $m^3$/h to 100 $m^3$/per 1 ton;
ozone air mixture pressure is of 2000 Pa to 10000 Pa;
seeds humidity is by of 2% to 10% more as compared to initial one;

air temperature in the intergrain space is from 20° C. to 38° C.;

ozone air mixture ozone concentration is from 0.05 g/m3 to 0.5 g/m3;

ozone air mixture seeds exposure time is from 0.5 hours to 2 hours;

ozone dose is from 3 g/t to 36 g/t;

When the method is performed with the present invention, it provides for the following advantages:

influence of environmental parameters of the processes of drying, disinfecting, safe storage and perforation of seed material by implementation of a silo container of heat-insulated type is reduced, evenness and efficiency of grain and seeds treatment is provided due to possibility of layer-by-layer blowing of the bulk through, period of time for drying is reduced, quality of the bulk treatment is increased, power consumption is decreased due to alternating supply of heated air and ambient air into the intergrain cavity, and also due to supplying of agents the parameters of which do not differ from the parameters discharging sources, speed of treatment and safety of surfacing are increased due to removal of use agents outside dryers with upper part without subsequent contact of agents with grain and seeds, effective saturation of grain and seeds with ozone is achieved, and as a result pass are inhibited both outside and inside the grain and seeds during 2-10 hours during previous of moist grain and seeds while growing them through with heated air, bulk of 60 t grain and seeds is dried during period of 7-17 hours depending on initial humidity of grain and seeds, as well as temperature of supplied heated air, productivity is increased, providing effective disinfection (cleaning) of seeds due to introduction of conditions for moistening and warming up seeds of ozone air treatment; compared to activation of dry seeds, the treatment of moist seeds leads lower energy consumption.

The inventive method is implemented with the use of a silo dryer having a transverse lowering through.

The dryer has a cylinder case supported by longitudinal stiffening ribs, a roof composed of sectors, and bottom which is fastened to upper and lower ends in the case correspondingly, and also a cylindrical perforated container with a convex lid installed in a center of the bottom when connected by pipelines with sources of charging ambient air and gaseous fumigant.

The proposed dryer is configured as a "thermos" dryer, with a case composed of two shells connected to each other with a depth by means of longitudinal ribs. The outer shell at the upper end has a slots evenly located along its parameter, while an inner shell is provided with perforations. The central perforation container or shell has a height exceeding the height of the case and separated by transverse walls with creation of autonomous cavities, each connected by the pipeline, placed mainly in the perforated container, with proper sources of ambient air, including heated air, with a ventilator equipped with a block of heating as well as with sources of charging gaseous fumigant, preferably equipped an ozone generator. Circular branch pipes connect pipelines that supply air and fumigant with one another.

The sectors of the dryer roof are equipped with heat-insulating covering on each side. The dryer bottom is formed as a "bowl" with an inner conical surface that is composed of circular metal sectors of a frame type. The sectors are connected to each other at the locations of joints by protective straps, under which in the channels, there are installed pipelines, discharging mechanism, and also servicing hatch-manifold. At the same time, the circular wall of the bottom is composed of two drums connected to the shells of the cases. Cleansing hatches are arranged on the external shell of the bottom, empty cavities of the sectors are filled with heat-insulating material, which is not critical for maintenance conditions, preferably polystyrene-concrete.

The aeration intersilo grain dryer has a case 1, a roof 2, and a bottom 3. The case is composed of two shells, namely an outer power shell 4 and an intershell 5 provided with perforations. In the cavity between the shells 4 and 5, uniformly along the parameter, longitudinal ribs 6 are provided and have a roof-shaped in a transverse cross-sections. The shells 4 and 5 are assembled with panels and connected to each other by shells of the longitudinal ribs 6 with screw bolts. To fastening the panels of the perforated shell 5, on the inner side of the rib 6, bushes are provided with inner screw thread openings.

The cone-shaped roof connected to the shells 4 and 5 in the upper part is assembled of panels. The surfaces of the roof panels are provided on their outer and inner sides with a heat-insulating covering of "Thermal-shield" type, which was used on U.S. spaceship "Shuttle". To fasten the shells 4 and 5 to the roof 2, brackets 7 of a T-shaped type are used to fasten the shells 4 and 5 to the roof 2. In the lower part of the shells 4 and 5 circular walls 8 and 9 overlapping the bottom 3 are fastened. A cylindrical perforated container 10 is attached to the bottom 3 in the dryer axle. The container 10 which forms an air-distributing device is provided with a conical inner surface and has some, for example five perforated autonomous cavities 11 located one after the other over the height which exceeds the height of the case 1. The flanged joints between the cavities 11 are covered by transverse walls (bottom) 12 and connected by screw-bolts.

A pipeline 13 extends into each cavity 11 and is connected with an air heater 14, a ventilator 15, and an ozone generator 16. Circular branch pipes 17 connect the pipelines 13. A portion of air (gas) is supplied into a cavity 18 of the dryer through perforated cavities 11, the height of which corresponds to a thickness of the layer of grain that is blown through.

A cavity 19 formed between the shells 4 and 5 is connected with outer atmosphere through slots 20 covered by a perforated belt 21 and evenly located under the roof 2.

A reflector 22 with a convex shape is arranged in the upper end of the air-distributing device 10. It is used as a distributor of grain stream, supplied into the dryer through a neck in the roof 2. In the lower part, the air-distributing device is fastened to the metallic frame of the bottom 3 by a flange 23.

The bottom 3 of the dryer is formed as a bowl with an inner conical surface. It is composed for example of seven metal circular sectors 24 of a frame shape that are clamped together by protective straps 25. A cavity 26 is formed in the center of the bottom 3, where the sectors 24 meet by their tops. Their distributing device 10 is located above the cavity 26. Channels 27 are formed in the longitudinal planes of the joints of the sectors 24, under the protective straps 25. Pipelines 13 are located and connected with the systems 14, 15, 16. The vertical pipelines 13 are located inside of the air-distributing device 10 and extends to each autonomous cavity 11. Channels 28 are formed in two opposite places of the joints of the sectors 24 and under the protective straps 25. A discharge mechanism 29 formed for example as a screw, a conveyor, and the like, is located on one side, for unloading grain. While, a perforated service hedge-manhole 30 is provided at an opposite side for maintenance of the dryer cavity by lids. In addition, cleaning hatches 31 are formed on the outer circular wall 8 of the bottom 3 and connected with the cavity between the walls 8 and 9. Empty space of cavities of the sectors 24 is filled with a heat-insulating material 32, for example of the styrene-concrete.

Sequence of the Dryer Assembling

Bottom 3 of the dryer is assembled on the plane of the concrete basis (M) by installing sectors 24 along the perimeter, in joint to each other, with the subsequent fastening sectors to each other by protective straps 25. Thus, the supporting surface of bottom 3 that contacts with the concrete basis (M) is mainly covered by the metal sheet. Whereupon on external circular wall 8 of each sector 24 the cleaning hatches 31 are performed. The cavities of sectors 24 (if they are made without filler) are further filled with heat-insulating material 32. Whereupon bottom 3 as built is fastened on the concrete basis (Б) by the fundamental screw-bolts (not shown at the drawn.).

Further, in the channels 27, there are installed pipelines 13, for example, five ones, after the quantity of autonomous cavities 11 of air-distributing device 10. Pipelines 13 as rays meet at the center of the bottom. To pipelines 13 outside cavity 26, there are fastened transitional branch pipes changing horizontal direction of axis for passable cut of pipeline 13 for vertical direction. Whereupon joints of sectors are blocked by longitudinal protective straps 25. Screw (conveyer) 29 is set in channel 28 equipped with the receiving hatches and gates for unloading grain. Then hatch-manhole 30 with lids is set.

Cone-shaped roof 2 is further constructed with the help of the above said panels. The roof is equipped with the external and internal heat-insulating layers. While increasing step by step along the height from top to bottom, there are being fastened the panels of shells 4 and 5 to roof 2 with the help of brackets 7. At assembling brackets 7, between the end of shell 4 and roof 2 surface there appears the circular gap, which is blocked by perforated belt 21. Shells 4 and 5 of the case are folded (registered) by tiers, beginning with the top one. Ribs 6 are bolted to shell 4. Then to the opposite shelves of ribs 6 there are also bolted the panels of perforated shell 5. Thus, to prevent gas penetration from the cavity 19 into dryer cavity 18, the crimp cavities of the roof of the П-shaped type in places of fastening brackets 7 are blocked by plugs.

In the lower portion, shell 4 is fastened overlapping to external wall 8 of bottom 3, and shell 5 is attached to inner wall 9.

Air-distributing device 10, after arranging all pipelines 13, is fastened to the metal frame of bottom 3 with the use of flange 23.

After assembling bottom 3, roof 2, shells 4 and 5, the sources 14, 15 and 16 are connected to pipelines 13. There is further set the other systems to be necessary for dryer operation, for example, humidity and temperature sensors.

The aeration intersilo dryer operates as follows:

Grain, for example by means of noria (not shown in the drawings) is supplied into the cavity 18 of the dryer through the neck in the roof 3 and distributed by the deflector 22.

Then, during filling of the dryer cavity with grain, the sources 14, 15, 16 of supplying and heating air and disinfectant are put into operation. The agents under pressure are supplied through the pipelines 13 and enter the perforated autonomous cavities 11. The agent further pass in the horizontal direction along the way of the least resistance through the grain bulk and, taking grain moisture away, penetrate through the perforations in the shell 5 into the cavity 19. Then the agents lead the dryer through the slots 30.

The supply of air (gas) into each autonomous cavity 11 is provided by the high-pressure ventilator 15 equipped with the air heater 14, and the ozone generator 16 with power which is sufficient for treatment of the bulk layer taking into account the depths of its location and a grain humidity level. In order to adjust volumes of agents to be supplied, the pipeline 13 are circularly connected by the branch pipes 17 and corresponding gates.

After completing the grain treatment process, the discharging screw (conveyor) 29 is activated, the gates on the protective straps 25 are open, and grain is transported into hatches of the screw and then discharge outside from the dryer for subsequent storing. If necessary, the grain can be stored on the dryer for a long time under aeration conditions.

Hatches 31 are used for cleaning a bottom of "out of jacket" cavity 19 from possible grain dirt. The maintenance of the dryer cavity is carried out through the hatch-manhole 30.

For treatment of grain and seeds with a mass smaller than the dryer capacity, a grain (seeds) layer is covered with an elastic casing.

In the proposed device because of the provision of the dryer case with the additional inner perforated wall and heat-insulating covering roof and the bottom surfaces, the following advantages are provided:

moisture from grain is removed by a short horizontal path of air flow. Based on the porosity (distance between the grains) of the bulk in the horizontal direction is by 30-35% greater than in the vertical direction, the bulk resistance to passing the stream in the direction is lower and accordingly there is less need in the ventilator power to go through the bulk, removing of air (gas) saturated with moisture (after treatment of the bulk) into atmosphere through the cavity between the drums and further into and through the slotted openings under the roof eliminates a subsequent contact of the wasted moistened air with grain, heat insulation of the case, roof and dryer bottom allows to maintain preset parameters of environment and grain inside the container, that promotes efficiency of disinfection, drying and safe storage, the use of two shells provides for redistribution of loading (inner stresses from grain, weight and external ones, because of wind head), that increases strength of the dryer case.

Due to the use of the air distributing device with set of autonomous perforated cavities, it is provided that:

supplied air (heated air) and ozone air mixture at any height of the drain bulk maintains their initial characteristics;

time of disinfection and drying a bulk due to simultaneous supply of air or ozone air mixture into the autonomous cavities is shortened, evenness and intensity of drying is obtained.

Due to the location of the upper section of air distributing device in the roof (high upper end of the case) cavity, used agents are effectively removed from the cavity in the upper layer of grain is evenly dried.

4. Because of the introduction of the circular branch pipes for linking the supply system pipelines, improved conditions are created for regulation of the process of grain drying and disinfection.

The construction of the dryer bottom with the inner conical surface composed of metal heat-insulated circular sectors, it is provided that:

construction reliability, reduction of metal expense and increase of operational quality are achieved, total amount of factor and manufacture components is increased, with the exception of the use of special construction equipment and concrete works.

The new aeration dryer in accordance with the present invention provides for the following advantages when compared with existing solutions:

- higher characteristics of grain quality at lower cost of equipment power consumption,
- a reduction of the cost of process of drying and increased ecological safety of grain and environment is providing environmental safe conditions, with a moisture removal from the grain,
- processes of drying, disinfection and detoxification of grain are provided, and safe storing and pretreatment before sowing that stimulates the rise of productivity are achieved in the single unit,
- influence of weather conditions in the process of treatment and storage of grain and seeds is reduced, and as a result the power consumption is decreased.
- high quality of drying and disinfection of grain and seeds in the dryer is achieved, irrespective of the type of grain and seeds bulk,
- durability and firmness of the dryer case construction to internal and external loads is increased and the dryer cost is reduced,
- the time for drying and disinfection of grain seeds due to simultaneous treatment by agents of all layers of the bulk by the same sources of charging is shortened, cost of preparation for production, mounting and service the dryer due to the use of standard auxiliary equipment from manufacturing silos is diminished,
- a possibility is provided for safe and economical drying-up process after the intentionally incomplete thermal drying.

The dryer in accordance with the present invention provides high-quality level drying, disinfection, safe storage of grain and seeds and pretreatment of seeds and sowing, with simplified construction and higher accessibility, and with the same time no dependence upon the presence of natural gas in the place of use.

Taking into consideration the developed technologies, the proposed dryer can become a main source for disinfection and drying of grain seeds, and can make a serious alternative to thermal dryers. In addition, the use of this dryer make it possible to treat any moist grain and seeds with starting signs of spoilage, and to use its safe as sterns, and also will allow to carry out pretreatment of seeds before sowing to stimulate their productivity.

It will be understood that each of the elements described above, or two or more together, may also find a useful application in other types of methods and constructions differing from the type described above.

While the invention has been illustrated and described as embodied in a method of aeration disinfecting and drying grain in bulk and pretreating seeds, and a transverse blow silo grain dryer therefore, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

The invention claimed is:

1. A method of aeration drying and disinfecting grain crops in bulk and pretreating seeds, comprising the steps of:
   filling a cavity located within a first portion of a case with a bulk of grain crops and seeds, the case having an inner perforated shell with a plurality of perforations and an outer solid shell;
   supplying a substantially vertical distributing device located within a second portion of the case with disinfecting and drying agents including an ozone and air mixture and surrounding air;
   subdividing the disinfecting and drying agents into a plurality of streams spaced from one another in a vertical direction;
   passing the streams from within the distributing device into the cavity and through the bulk of grain crops and seeds at different heights through levels located at corresponding heights of the bulk of grain crops and seeds transversely in a substantially horizontal direction, and from within the cavity through the plurality of perforations of the inner shell such that the disinfecting and drying agents are removed from the bulk of grain crops and seeds and subsequent contact of the agents with the bulk of grain crops and seeds is eliminated.

2. A method as defined in claim 1, further comprising arranging in the bulk of grain crops and seeds the distributing device, wherein the distributing device has cavities located at different heights and a perforated wall with a plurality of perforations; and supplying the streams of the disinfecting and drying agents from each of the cavities of the distributing device through the perforated wall in the horizontal direction and through respective layers of the bulk of grain crops and seeds.

3. A method as defined in claim 1, further comprising accommodating the bulk of grain crops and seeds inside the inner perforated shell; passing the streams of the disinfecting and drying agents through the perforated shell into a space between the inner perforated shell and the outer solid shell; and withdrawing used disinfecting and drying agents from the space outwardly.

4. A device for aeration drying and disinfecting grain crops in bulk and pretreating seeds, comprising:
   a means for filling a cavity located within a first portion of a case with a bulk of grain crops and seeds, the case having an inner perforated shell with a plurality of perforations and an outer solid shell;
   a means for supplying a substantially vertical distributing device located within a second portion of the case with disinfecting and drying agents including an ozone and air mixture and a surrounding air;
   a means for subdividing the disinfecting and drying agents into a plurality of streams spaced from one another in a vertical direction;
   a means for passing the streams from within the distributing device into the cavity and through the bulk of grain crops and seeds at different heights through levels located at corresponding heights of the bulk of grain crops and seeds transversely in a substantially horizontal direction, and from within the cavity through the plurality of perforations of the inner shell such that the disinfecting and drying agents are removed from the bulk of grain crops and seeds and subsequent contact of the agents with the bulk of grain crops and seeds is eliminated.

5. A device as defined in claim 4, further comprising a means for arranging in the bulk of grain crops and seeds the distributing device, wherein the distributing device has cavities located at different heights and a perforated wall with a plurality of perforations; and a means for supplying the streams of the disinfecting and drying agents from each of the cavities of the distributing device through the perforated wall in the horizontal direction and through respective layers of the bulk of grain crops and seeds.

6. A device as defined in claim 4, wherein the bulk of grain crops and seeds is accommodated inside the inner perforated shell, the streams of the disinfecting and drying agents pass through the perforated shell into a space between the inner perforated shell and the outer solid shell, and used disinfecting and drying agents are withdrawn from the space outwardly.

7. A device as defined in claim 6, wherein the disinfecting and drying agents are withdrawn through slots located at an end of the outer shell.

* * * * *